United States Patent
Hannewald et al.

(10) Patent No.: US 7,581,532 B2
(45) Date of Patent: Sep. 1, 2009

(54) METHOD FOR RECIRCULATING A PARTIAL EXHAUST GAS FLOW TO AN INTERNAL COMBUSTION ENGINE OF A MOTOR VEHICLE

(75) Inventors: Thomas Hannewald, Griesheim (DE); Eckhart Kern, Hofheim (DE)

(73) Assignee: Siemens Aktiengesellschaft, Munich (DE)

( * ) Notice: Subject to any disclaimer, the term of this patent is extended or adjusted under 35 U.S.C. 154(b) by 299 days.

(21) Appl. No.: 10/568,407

(22) PCT Filed: Oct. 14, 2005

(86) PCT No.: PCT/EP2005/055257
§ 371 (c)(1),
(2), (4) Date: May 3, 2007

(87) PCT Pub. No.: WO2006/056511
PCT Pub. Date: Jun. 1, 2006

(65) Prior Publication Data
US 2008/0245348 A1 Oct. 9, 2008

(30) Foreign Application Priority Data
Nov. 26, 2004 (DE) .................. 10 2004 057 306

(51) Int. Cl.
*F02M 25/07* (2006.01)
(52) U.S. Cl. ................ 123/568.12; 123/568.2

(58) Field of Classification Search ............ 123/568.12, 123/568.21, 568.2
See application file for complete search history.

(56) References Cited

U.S. PATENT DOCUMENTS

| | | | | |
|---|---|---|---|---|
| 5,203,311 A | * | 4/1993 | Hitomi et al. | 60/605.2 |
| 5,617,726 A | * | 4/1997 | Sheridan et al. | 60/605.2 |
| 5,732,688 A | * | 3/1998 | Charlton et al. | 123/568.12 |
| 6,155,042 A | * | 12/2000 | Perset et al. | 60/278 |
| 6,895,752 B1 | * | 5/2005 | Holtman et al. | 60/605.2 |
| 6,976,480 B2 | * | 12/2005 | Miyoshi et al. | 123/568.12 |
| 7,163,005 B2 | * | 1/2007 | Tussing et al. | 123/568.12 |
| 7,195,006 B2 | * | 3/2007 | Khair et al. | 123/568.12 |
| 7,284,544 B2 | * | 10/2007 | Hatano | 123/568.12 |
| 7,363,919 B1 | * | 4/2008 | Styles | 123/568.12 |
| 7,428,897 B2 | | 9/2008 | Koster et al. | |
| 2007/0181106 A1 | | 8/2007 | Koster et al. | |

FOREIGN PATENT DOCUMENTS

DE 197 33 964 2/1999

(Continued)

*Primary Examiner*—Thomas N Moulis
(74) *Attorney, Agent, or Firm*—Cohen Pontani Lieberman & Pavane LLP

(57) ABSTRACT

In the present method, a partial flow is guided through a partial flow line connected downstream of an exhaust gas outlet of an internal combustion engine, and is immediately thereafter supplied to an internal combustion engine either via a first valve, a bypass line which is connected directly downstream and a recirculation line. Alternatively, the partial exhaust gas flow can be supplied to the internal combustion engine via a second valve, a radiator which is connected directly downstream and a recirculation line. The first valve and the second valve are opened or closed as a function of the exhaust gas conditions, this being monitored by a sensor. A device for carrying out the method is also disclosed.

7 Claims, 1 Drawing Sheet

FOREIGN PATENT DOCUMENTS

| | | |
|---|---|---|
| DE | 103 21 637 | 3/2004 |
| EP | 0 987 427 | 3/2000 |
| EP | 0 994 247 | 4/2000 |
| EP | 0 848 155 | 4/2003 |
| EP | 1 375 838 | 1/2004 |
| EP | 1 747 369 | 9/2007 |
| GB | 2 301 177 | 11/1996 |
| JP | 2004-257366 | 9/2004 |
| WO | WO 02/16750 | 2/2002 |

* cited by examiner

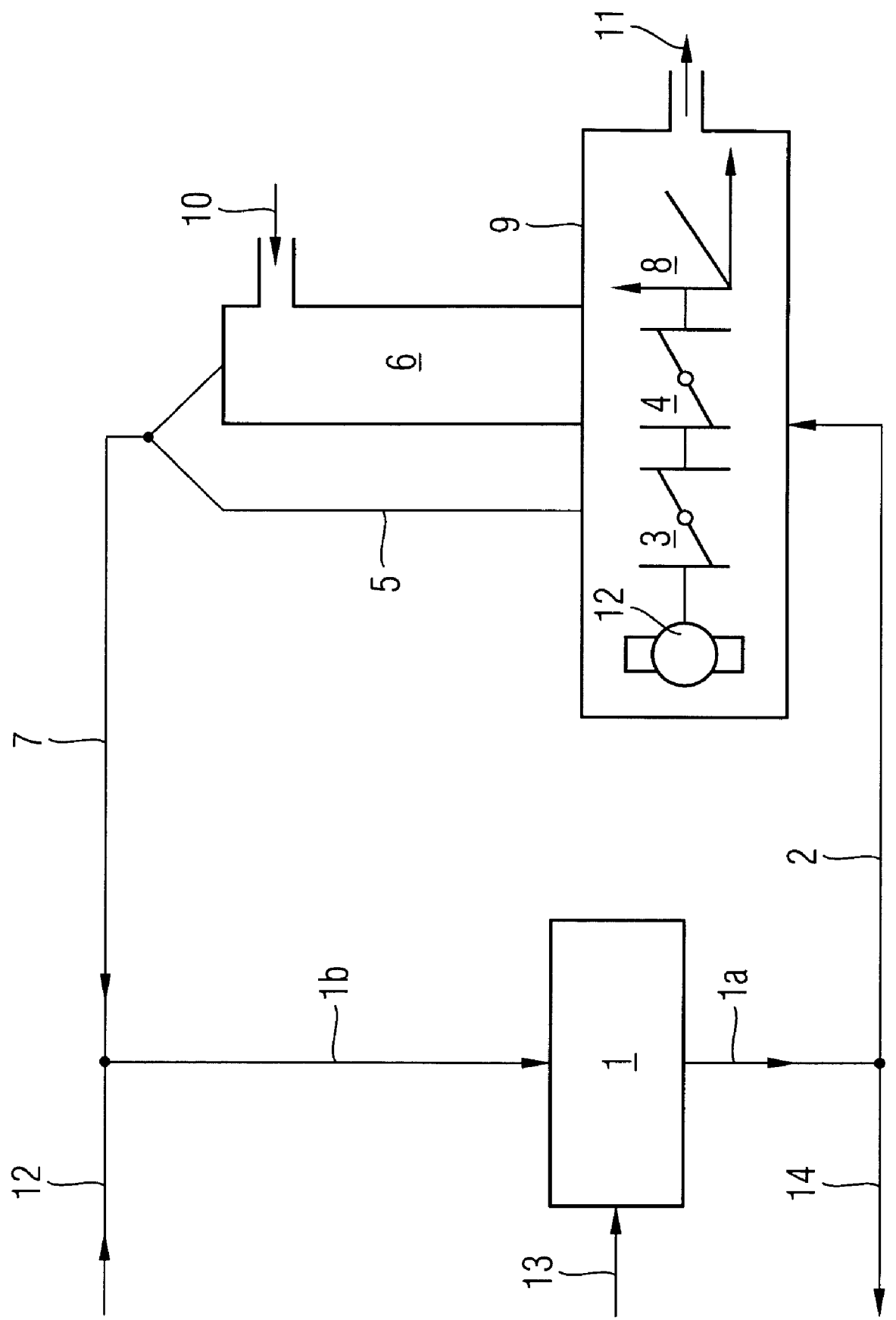

METHOD FOR RECIRCULATING A PARTIAL EXHAUST GAS FLOW TO AN INTERNAL COMBUSTION ENGINE OF A MOTOR VEHICLE

BACKGROUND OF THE INVENTION

The invention relates to a method for recirculating a partial exhaust gas flow to an internal combustion engine of a motor vehicle. The invention also relates to a device for carrying out the method.

Methods for recirculating partial exhaust gas flows to an internal combustion engine are known. DE-Patent 196 80 305 C2 describes an exhaust gas recirculation system for an internal combustion engine. In this system, some of the exhaust gases produced by the engine are recirculated from an exhaust line of the engine into an intake line of the engine, the exhaust gas recirculation system having a recirculation line downstream of the exhaust line of the engine. This recirculation line splits into a bypass line and a radiator line having an integrated radiator. The bypass line and the radiator line each have a valve at their end, downstream of which the bypass line and the radiator line are once again combined into a single line. The partial exhaust gas flow then flows back into the engine via this line. A disadvantage of this method is however that the two valves become clogged relatively quickly by particulates and condensate products in the exhaust gas, which affects both the actual operation and the actuation of the two valves which are completely opened or completely closed alternately to one another. The valves are actuated by an electronic control unit such that the partial exhaust gas flow flows via the bypass line in operating modes at low engine temperature or low engine load, and via the radiator line in other engine operating modes. The clogging of the valves has an adverse effect on the actuation by the electronic control unit so that varying exhaust gas conditions can only be reacted to with a time lag. It is therefore the object of the invention to provide a method for recirculating a partial exhaust gas flow to an internal combustion engine of a motor vehicle in which clogging of shut-off valves is largely prevented. It is also the object of the invention to produce a device for carrying out the method.

SUMMARY OF THE INVENTION

The object on which the invention is based is achieved by means of a method for recirculating a partial exhaust gas flow to an internal combustion engine of a motor vehicle, in which the partial flow is guided through a partial flow line connected downstream of the exhaust gas outlet of the internal combustion engine, and is immediately thereafter supplied to the internal combustion engine either via a first valve, a bypass line which is connected directly downstream and a recirculation line or via a second valve, a radiator which is connected directly downstream and a recirculation line, the first and second valves being opened or closed as a function of the exhaust gas conditions, this being monitored by a sensor. Both the first valve and the second valve are connected in parallel between the partial flow line and the bypass line or radiator respectively. They are cooled during operation. The operating modes of the first valve and second valve, which are to be set as a function of the exhaust gas conditions, are monitored by the sensor. In this case, intermediate positions are possible so that two functions are to be assigned to the first valve and the second valve. On the one hand, these are used to control whether the partial flow is guided through the bypass line or through the radiator. On the other hand, these are used to set the size or volume of the partial flow.

Surprisingly, it has been shown in the method that deposits in the first valve and in the second valve are avoided after relatively short periods of operation. The exhaust gases which are guided through the first valve or through the second valve remain at a temperature which is such that no caking occurs in the first valve or in the second valve. No disadvantageous condensate products accumulate either in the first valve or in the second valve, since the bypass line and the radiator are connected downstream of the first valve and the second valve respectively. It is also advantageous that both the first valve and the second valve can be actuated for relatively long periods of operation with virtually no time lag, so that varying exhaust gas conditions can be reacted to relatively quickly.

In one preferred embodiment of the invention, the partial flow is guided through a valve unit which comprises the first valve, the second valve and the sensor. By integrating the first valve, the second valve and the sensor to form a valve unit, the installation space is reduced, as is generally desirable in motor vehicles. In addition, the use of a valve unit is advantageous in that it can be pre-manufactured, which is favourable for the production process.

According to a further embodiment of the invention, the partial flow downstream of the second valve is guided through a radiator, arranged as the radiator which is connected downstream, having liquid coolant, the liquid coolant being guided both through the radiator which is connected downstream and through the valve unit. A water mixture is generally used as the liquid coolant. In this case, it is generally advantageous if the valve unit and the radiator which is connected downstream have a common housing through which the liquid coolant is guided by means of for example radiator coils. In this way, installation space is advantageously saved and cooling performance optimized.

The object on which the invention is based is also achieved by means of a device for carrying out the method, which comprises a partial flow line which is connected to a first valve and to a second valve, the first valve being connected to a recirculation line by means of a bypass line and the second valve being connected to a recirculation line by means of a radiator which is connected directly downstream, and a sensor being arranged which monitors both the actuation of the first valve and of the second valve as a function of the exhaust gas conditions. By means of the respective arrangement of the first valve and of the second valve upstream of the bypass line and upstream of the radiator which is connected directly downstream, accumulations in the first valve and in the second valve can be advantageously avoided in such a way that relatively fast actuation is ensured even with varying exhaust gas conditions.

According to a further advantageous embodiment of the invention, it is provided that a radiator having liquid coolant is arranged as the radiator which is connected downstream. In this way, the temperature of the exhaust gases can be reduced relatively quickly.

In a further embodiment of the invention, a valve unit is arranged which comprises the first valve, the second valve and the sensor. In this case, this is a structural subunit, the arrangement of which advantageously reduces the installation space required.

According to a further embodiment of the invention, the radiator which is connected downstream comprises a coolant inlet and the valve unit comprises a coolant outlet. This means that the same coolant flows through and thus cools both the radiator which is connected downstream and the valve unit, which is likewise advantageous in terms of reducing the size of the installation space. The coolant inlet and the coolant outlet can advantageously be formed for example in the form of pipe connecting pieces.

BRIEF DESCRIPTION OF THE SEVERAL VIEWS OF THE DRAWINGS

The invention is explained in the following in more detail and by way of example on the basis of the drawing (FIGURE).

DETAILED DESCRIPTION OF THE INVENTION

FIGURE shows a method flow chart of the method for recirculating a partial exhaust gas flow to an internal combustion engine of a motor vehicle.

FIGURE illustrates a method flow chart of the method for recirculating a partial exhaust gas flow to an internal combustion engine 1 of a motor vehicle. The exhaust gas flows out of the internal combustion engine 1 into the partial flow line 2 via the exhaust gas outlet 1a. Only the partial exhaust gas flow is then guided in the partial flow line 2. The remaining volume of exhaust gas flows via the exhaust line 14 to the exhaust (not illustrated). Immediately downstream of the partial flow line 2, the partial exhaust gas flow is supplied back to the internal combustion engine 1 either via a first valve 3, a bypass line 5 which is connected directly downstream and a recirculation line 7 or via a second valve 4, a radiator 6 which is connected directly downstream and a recirculation line 7. The exhaust gas conditions determine whether the partial exhaust gas flow is guided via the first valve 3 and the bypass line 5 or via the second valve 4 and the radiator 6 which is connected directly downstream. These respective procedures are monitored by means of a sensor 8. This means that either the first valve 3 or the second valve 4 is opened or closed depending on the exhaust gas conditions. At low exhaust gas temperatures or at low engine power, the partial flow is guided via the bypass line 5, and at higher temperatures or at high engine power, via the radiator 6 which is connected directly downstream. The recirculation line 7 issues directly into a gas inlet line 1b which is directly connected to the internal combustion engine 1. Air is also added via a supply line 12 into the gas inlet line 1b, so that a mixture of the partial exhaust gas flow and air flows into the internal combustion engine 1 via the gas inlet line 1b. The radiator 6 which is connected directly downstream is embodied as a radiator having liquid coolant. It has a coolant inlet 10 through which the coolant flows into the radiator 6 which is connected downstream. The liquid coolant then flows via the radiator 6 which is connected directly downstream into the valve unit 9 which comprises the first valve 3, the second valve 4 and the sensor 8. The valve unit 9 has a coolant outlet 11 through which the liquid coolant is discharged from the system. The first valve 3 and the second valve 4 are operated by an electric motor 12 which is likewise arranged in the valve unit 9. The fuel for the internal combustion engine 1 is supplied to the internal combustion engine 1 via the fuel line 13.

The invention claimed is:

1. A method for recirculating a partial exhaust gas flow to an internal combustion engine of a motor vehicle, comprising the steps of:

guiding the partial flow though a partial flow line connected downstream of an exhaust gas outlet of the internal combustion engine, supplying the partial flow immediately thereafter to the internal combustion engine either via a first valve, a bypass line which is connected directly downstream and a recirculation line or via a second valve, a radiator which is connected directly downstream and a recirculation line, opening or closing the first valve and the second valve as a function of the exhaust gas conditions, and monitoring the opening and closing with a sensor.

2. The method according to claim 1, wherein the partial flow is guided through a valve unit which comprises the first valve, the second valve and the sensor.

3. The method according to claim 2, wherein the partial flow downstream of the second valve is guided through a radiator, arranged as the radiator which is connected downstream, having liquid coolant, the liquid coolant being guided both through the radiator which is connected downstream and through the valve unit.

4. A device for recirculating a partial exhaust gas flow to an internal combustion engine of a motor vehicle, a partial flow line;

a first and second valve connected to the partial flow line;

a recirculation line connected to the first valve by means of a bypass line;

a radiator arranged to connect the second valve directly downstream to the recirculation line, and a sensor to monitor actuation of the first valve and of the second valve as a function of the exhaust gas conditions.

5. The device according to claim 4, wherein the radiator includes liquid coolant and is arranged downstream.

6. The device according to claim 5, further comprising a valve unit including the first valve, the second valve and the sensor.

7. The device according to claim 6, wherein the radiator is connected downstream and comprises a coolant inlet and the valve unit comprises a coolant outlet.

* * * * *